Patented Dec. 15, 1925.

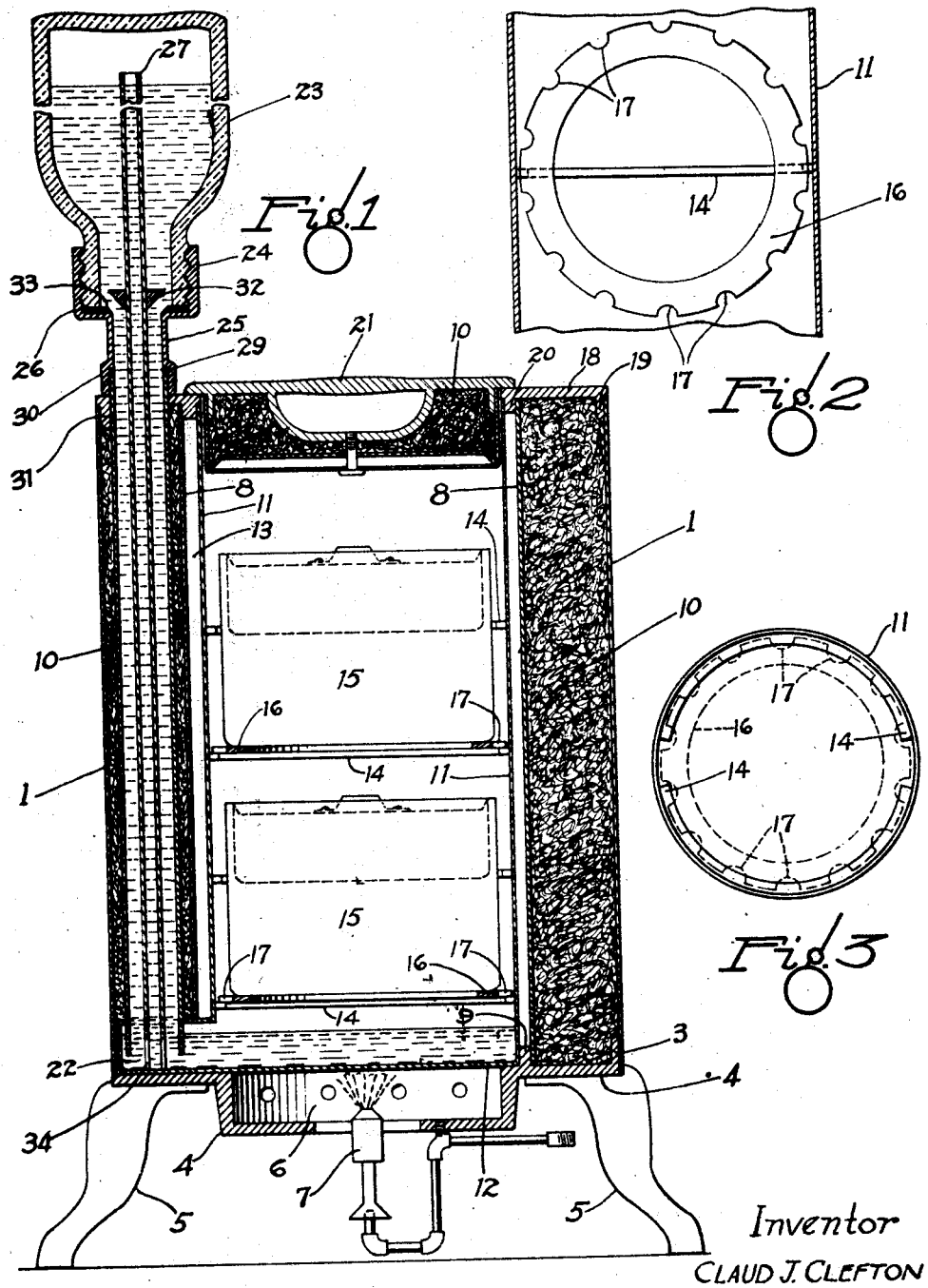

1,565,714

UNITED STATES PATENT OFFICE.

CLAUD J. CLEFTON, OF OWATONNA, MINNESOTA, ASSIGNOR, BY MESNE ASSIGNMENTS, TO RUTH P. CLEFTON, OF ST. PAUL, MINNESOTA.

COOKER.

Application filed December 27, 1920. Serial No. 433,299.

*To all whom it may concern:*

Be it known that I, CLAUD J. CLEFTON, a citizen of the United States, resident of Owatonna, Steele County, Minnesota, have invented certain new and useful Improvements in Cookers, of which the following is a specification.

This invention relates to novel improvements in cookers and it more particularly relates to improvements in that type of cooking units in which heat is applied to the cooking compartment through the intermediary of water.

In cooking units of this type it is highly advantageous that the water in the chamber be not allowed to boil dry to the obvious detriment of the cooker and to that of the articles placed therein. This invention obviates such contingency by assuring maintenance of the level of the water in the compartment.

An object, therefore, of this invention, is to provide an improved cooking unit.

A more specific object is to provide such a cooking unit with means to maintain the water by which the cooking is effected, at a substantially constant level.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

In the accompanying drawings:

Figure 1 is a vertical sectional view of the cooker;

Figure 2 is a view showing the manner of inserting a ring support;

Figure 3 is a plan view showing a segmental ledge and illustrating in dotted lines the position of a seated ring support.

This present invention relates to improvements in the construction of the cooker unit forming the subject-matter of the prior patent of the inventor hereof, No. 1,381,800. This invention is particularly directed to simplification of the waterway, air vent and valve construction.

This novel cooking unit is provided with a substantially cylindrical casing 1, secured by any suitable means to lugs 3 of the base 4. The base 4 is supported by the legs 5. This base is provided with a heating chamber 6 adapted to receive heat from any suitable heating element such as an acetylene gas burner 7. The second or inner casing 8 of less diameter is positioned within the casing 1 and is held in position by a substantially annular flange 9 of the base 4. The annular space between the casings 1 and 8 is preferably filled with an insulating material 10 to insulate against heat radiation.

The cooking compartment is positioned within the space defined by the casing 8 and is preferably formed by a cylindrical member, the annular wall 11 of which is provided with an integral base 12. This compartment base 12 rests upon the base 4 and is properly positioned by the inside face of the base flange 9. This cooking compartment is spaced apart from the inner casing 8 and is insulated therefrom by the circumferential air space 13, between the compartment 11 and the inner casing 8.

Support for cooking receptacles is afforded by means interiorly projecting from the compartment wall 11. Such projecting means are afforded by a plurality of narrow ledges 14 which may be secured to the inner face of the wall 11 as by welding. A plurality of such ledges is provided in the cooking compartment, four being shown in this selected embodiment of the invention. Each ledge is formed of a narrow ring having opposed cut-away portions. In other words, each ledge is made up of two complementary arcuate strips, each being less than a semicircle so that their terminals are spaced apart, as indicated in Figure 3. The receptacles 15, employed in conjunction with this compartment, are of less outside diameter than the inside diameter of the substantially semicircular ledges 14 so that a receptacle may be lowered past an upper ledge to a lower. A plurality of rings 16, adapted to be positioned upon the supporting ledges, are preferably employed to hold the receptacles. These rings are flat and relatively narrow, the width of each being only that sufficient to engage the ledge members 14 and to support the bottom of the receptacles 15. The rings 16 are preferably provided with a plurality of apertures 17, in order to facilitate the passage of heated air from the lower portions of the compartment to the upper when the receptacles 15 are in place. These apertures or passages are provided by cut-away portions of the periphery of the ring so that a plurality of these passages are disposed in annularly spaced relation on each ring 16. The outside diameter of each ring 16 is less than the inside diameter of the compartment 11, but greater than the inside diameter of the ledges 14. Each ring is so dimensioned in order that it may be turned edgewise and be passed downwardly through spaces provided by the ledge members, and thereafter turned through 90 degrees and seated upon a lower edge.

The upper portion of the cooking unit is provided with an annular top 18 having two depending annular flanges 19 and 20. The outer flange 19 is adapted to have the upper portion of the casing 1 fitted closely thereagainst. The outer face of the inner flange 20 securely positions the inner casing 8 while the inner face of the annular flange receives thereagainst the upper portion of the cylindrical wall 11 of the cooking compartment. This flange 20 and the base flange 9 define the width of the insulating air space above mentioned. A cover 21 is provided for the compartment and is formed to contain insulating material 10 in order to reduce the loss of heat.

The lower portion of the substantially cylindrical compartment is formed to present a laterally extending chamber 22, as shown in Figure 1. The lower portion of the compartment and this communicating chamber are adapted to contain water which is heated by the heating element and the resultant heat communicated to the cooking compartment to cook the food in the receptacles.

To maintain the water at a proper efficient level is the function of the water container and its connections with the chamber and compartment. The preferred construction is to provide a water container such as a water bottle 23, the neck of which is shaped to be received in threaded engagement in the flanges 24 of the supplemental neck or collar 25.

The collar 25 terminates in an annular lip 30 which is adapted to be positioned on the end of the pipe 31. Preferably, the pipe 31 is carried by the collar 25 being secured thereto, as, for example, by means of a cementitious substance 29 which assures a hermetically sealed union. The pipe 31 extends from the casing exterior downwardly through the insulation 10 between the inner casing 8 and the casing 1, and enters the chamber 22 formed by the lateral extension of the base portion of the cooking compartment. The pipe 31 thus forms a tubular waterway connecting the compartment and the water bottle, and is supported by the collar 25 resting upon the top of the unit. The tube 27 provides an air vent which extends from a point above the level of the water in the water bottle, downwardly through the waterway provided by the pipe 31 and terminates at a point above the base 12 at which it is desired the water level be maintained. The lower portion of the tube 27 is provided with legs 34 depending therefrom and adapted to rest upon the base 12 of the compartment. The legs 34 are preferably integral and are formed by cutting away terminal portions of the tube 27. Hence, free communication is provided between the compartment and the air vent.

In order that the water bottle 23 may be inserted after filling and put in position without loss of contents, a valve 32 is secured to the tube 27 and is adapted to close the waterway by resting upon the valve seat 33 interiorly presented in the waterway by the packing 26. The water bottle, its neck or collar 25 and the pipe 31 preferably present a unitary structure. While the water bottle is being filled, the air vent tube 27 will drop to the bottom of the bottle so that water may enter. However, when the bottle is inverted, the tube 27 drops by gravity so that the valve 32 seats and closes the waterway to prevent egress of water. Such is the valve position while the pipe is inserted in the casing until the collar 25 rests upon the casing top. In such position, the legs 34 of the tube 27 rest upon the base 12 of the compartment thereby upwardly forcing the tube 27 as the pipe 31 is inserted. This upward movement of the tube 27 relatively to the pipe 31 and bottle unseats the valve 32 to the position shown in Figure 1, whereby water may descend the pipe 31 from the bottle to the compartment until the level in the latter is substantially at the end of the air vent tube 27.

The air vent provided by the tube 27 is of advantage in this initial filling operation as air from the compartment quickly ascends the empty vent and fills the vacuum tended to be created in the bottle by descent of the water past the open valve 32. Due to the length and relatively small diameter of the pipe forming the waterway, ascent of air through the waterway is very slow upon unseating of the valve. By the employment of the air vent, a rapid influx of air into the bottle 23 is permitted. This air ascent and water descent continues rapidly until the compartment becomes filled up to a level substantially at the lower end of the tubular air vent. Thereafter water will ascend the vent until the level therein is substantially equal to the level of the water in the bottle, whereupon further water movement ceases until, due to evaporation or steam generation, the compartment water-level falls below the lower end of the vent at which time the steam or air ascends the vent to the interior of the bottle 23 thus permitting water descent, automatically to replenish the water supply in the compartment.

To refill the water bottle, it is only necessary to lift the bottle and collar from the cooking unit and thereafter to reverse the bottle. As the bottle is raised the tube 27 drops so that the valve 32 is seated and, when the bottle is reversed from its inverted working position to an upright position, the valve 32 drops away from its seat and the bottle may then be filled through the waterway.

Having thus described my invention, what I claim as new and desire to secure by Letters Patent is:

1. A cooking unit having in combination a casing, a cooking compartment therein, a heating element to heat water in the compartment, a tubular waterway adapted to be inserted in the casing and to extend from the casing exterior to the compartment, a hermetically sealed water container adjacent the upper end of the waterway and opening thereinto, an air vent member extending longitudinally in the waterway and connecting the container interior and the compartment, the upper end of the vent member being above the level of the water in the container and its lower end substantially at the normal level of water in the compartment whereby water passes through the waterway when the lower end of the air vent member is uncovered and automatic maintenance of the normal water level is assured, and a valve exteriorly carried by said air vent to close said waterway and adapted to be opened when the waterway is inserted in the casing.

2. A cooking unit having a casing, a cooking compartment therein, and a heating element to heat water in the compartment in combination with a water bottle, a pipe carried by the bottle and opening thereinto, a tube longitudinally extending in said pipe, a valve carried by the tube and adapted to close the pipe, the bottle being adapted to be invertedly supported by said casing and to have said pipe extending therein to the compartment, and means on the end of the tube to engage the base of the compartment whereby the tube is moved with relation to the pipe whereby said valve is unseated and water may pass from the bottle to the compartment, said tube extending from a point above the level of the water in the inverted bottle to a point substantially at the normal level of the water in the compartment whereby water may descend through the pipe and replacing air may ascend through the tube when the lower end of the tube is uncovered and automatic maintenance of the normal water level is assured.

In witness whereof, I have hereunto set my hand this 21st day of December 1920.

CLAUD J. CLEFTON.